(12) United States Patent
Oshima et al.

(10) Patent No.: US 9,194,515 B2
(45) Date of Patent: Nov. 24, 2015

(54) THREADED JOINT FOR PIPES

(71) Applicants: NIPPON STEEL & SUMITOMO METAL CORPORATION, Tokyo (JP); VALLOUREC OIL AND GAS FRANCE, Aulyone-Aymeries (FR)

(72) Inventors: Masahiro Oshima, Tokyo (JP); Shin Ugai, Tokyo (JP); Takashi Okada, Tokyo (JP); Masayoshi Sasaki, Tokyo (JP); Suguru Yamaguchi, Tokyo (JP); Masaaki Sugino, Tokyo (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 14/372,036

(22) PCT Filed: Jan. 17, 2013

(86) PCT No.: PCT/JP2013/051363
§ 371 (c)(1),
(2) Date: Jul. 14, 2014

(87) PCT Pub. No.: WO2013/108931
PCT Pub. Date: Jul. 25, 2013

(65) Prior Publication Data
US 2015/0001841 A1    Jan. 1, 2015

(30) Foreign Application Priority Data

Jan. 19, 2012  (JP) .................................. 2012-008922

(51) Int. Cl.
*F16L 25/00* (2006.01)
*F16L 15/00* (2006.01)
*F16L 58/18* (2006.01)
*E21B 17/08* (2006.01)
*C10M 171/00* (2006.01)

(52) U.S. Cl.
CPC ............ *F16L 15/004* (2013.01); *C10M 171/00* (2013.01); *E21B 17/08* (2013.01);
(Continued)

(58) Field of Classification Search
USPC ......................................... 285/333, 334, 390
See application file for complete search history.

(56) References Cited

U.S. PATENT DOCUMENTS 2,992,019 A * 7/1961 MacArthur .................... 285/110
4,501,443 A * 2/1985 Haring ........................... 285/328
5,169,183 A * 12/1992 Hallez ........................... 285/334
5,474,334 A * 12/1995 Eppink .......................... 285/184
(Continued)

FOREIGN PATENT DOCUMENTS

WO    2009/060729    5/2009
WO    2009/072486    6/2009
WO    2011/027433    3/2011

*Primary Examiner* — Aaron Dunwoody
(74) *Attorney, Agent, or Firm* — Clark & Brody

(57) ABSTRACT

A threaded joint for pipes comprises a pin and a box, each having a threaded and unthreaded portion metal contact surface. The unthreaded metal contact portion includes a sealing surface and a shoulder surface, the shoulder surface of the pin located on the pin end surface. A non-contacting region where the pin and the box do not contact each other exists between the sealing surfaces and the shoulder surfaces of the pin and the box. One or more grooves is formed in at least one of the pin and the box shoulder surfaces and extending to the non-contacting region and to the interior of the joint. At least one of the contact surfaces has a solid lubricating coating exhibiting plastic or viscoplastic rheological behavior. A total volume V ($mm^3$) of the grooves and coating weight W (g) of the solid lubricating coating satisfy the equation $V/W \geq 24$ ($mm^3/g$).

6 Claims, 6 Drawing Sheets

(52) U.S. Cl.
CPC ....... *F16L 58/182* (2013.01); *C10M 2201/042* (2013.01); *C10M 2201/062* (2013.01); *C10M 2205/022* (2013.01); *C10M 2205/0225* (2013.01); *C10M 2205/183* (2013.01); *C10M 2207/026* (2013.01); *C10M 2207/1253* (2013.01); *C10M 2209/084* (2013.01); *C10M 2229/041* (2013.01); *C10N 2210/05* (2013.01)

(56) References Cited

U.S. PATENT DOCUMENTS

| 2010/0102553 | A1* | 4/2010 | Patureau et al. | 285/334 |
| 2011/0025051 | A1* | 2/2011 | Yamaguchi et al. | 285/333 |
| 2012/0235404 | A1* | 9/2012 | Coeffe | 285/332 |
| 2015/0145247 | A1* | 5/2015 | Zhu et al. | 285/333 |

* cited by examiner

THREADED JOINT FOR PIPES

TECHNICAL FIELD

This invention relates to a threaded joint for pipes (also called a tubular threaded joint) suitable for connecting oil country tubular goods and having grooves on its shoulder surface in order to allow a high pressure fluid to escape. Specifically, it relates to a threaded joint for pipes which prevents a deterioration in the performance of the grooves by a solid lubricant coating.

BACKGROUND ART

In recent years, oil wells are being deeper and are being developed in increasingly severe environments. For this reason, there is a strong desire that tubular threaded joints which are used to connect oil country tubular goods including tubing and casing for oil or gas wells have increased resistance to compression under internal and external pressures and improved sealing properties.

FIG. 1A is a cross-sectional view schematically showing the structure of a typical threaded joint for pipes, FIG. 1B is an enlarged schematic cross-sectional view of portion A in FIG. 1A, and FIG. 1C is a partial schematic cross-sectional view of the vicinity of the lip portion of a threaded joint for pipes disclosed in Patent Document 1.

As shown in FIGS. 1A-1C, the tubular threaded joint 0 is constituted by a pin 1 formed on the outer surface of both ends of steel pipes and a box 2 formed on the inner surface of a coupling which is a separate member. The pin 1 has a threaded portion 3 having male threads (external threads) and a lip portion 4 which is a portion closer to the pipe end. The lip portion 4 has a sealing surface 5 adjacent to the threaded portion 3 and a shoulder surface 9 on the front end surface of the pin 1. Correspondingly, the box 2 has a threaded portion 7 having female threads (internal threads), a sealing surface 8, and a shoulder surface 11. The threaded portions, sealing surfaces, and shoulder surfaces of the pin and the box constitute contact surfaces of a threaded joint.

A threaded joint is designed such that when the male threads and the female threads are tightened until the shoulder surfaces 9 and 11 of the pin and the box contact each other with a predetermined torque, their sealing surfaces 5 and 8 intimately contact each other with a predetermined interference to form a metal-to-metal seal which guarantees the desired gas tightness of the threaded joint. Prior to tightening, lubricating grease (typically compound grease) has conventionally been applied to the contact surfaces of the threaded joint in order to prevent the occurrence of galling of the threaded joint.

In the threaded joint for pipes shown in FIG. 1C, the lip portion 4 of the pin 1 extends in the axial direction to form a non-contacting region 13 where the pin and the box do not contact each other between the sealing surfaces 5, 8 and the shoulder surfaces 9, 11 of the pin and the box. By extending the lip portion in this manner, the pin has an increased resistance to deformation of the portion which is closer to its front end than the sealing surface. As a result, it is difficult for the sealing surface of the pin to deform even under a combined load of pressure and axial force, thereby making it possible to improve the gas tightness of the threaded joint.

The illustrated threaded joint has another non-contacting region 14 between one or more male threads of the pin 1 closest to the sealing surface 5 and the opposing surface of the box 2. The non-contacting region 14 is formed by providing a recess in the surface of the box and functions as a reservoir to collect lubricating grease expelled from the threaded portions which are tightened during makeup of the threaded joint.

In the threaded joint shown in FIG. 1C, the pin 1 has a second shoulder surface 10 between the shoulder surface 9 and the non-contact surface 13. The second shoulder surface 10 has a larger angle of slope with respect to a plane perpendicular to the pipe axis and a smaller radial dimension compared to the shoulder surface 9. The inner, larger shoulder surface 9 is referred to as a main shoulder surface, and the outer, smaller shoulder surface 10 is referred to as a sub-shoulder surface. Correspondingly, the box 2 has a sub-shoulder surface 12 in addition to the shoulder surface 11, which is a main shoulder surface. The main shoulder surfaces 9 and 11 of the pin and the box serve to withstand the compression stress applied during makeup of the threaded joint and also limit the radially inward deformation of the end of the lip 4, while the sub-shoulder surfaces 10 and 12 thereof serve to limit the radially outward deformation of the main shoulder surfaces when the main shoulder surfaces receive the compression stress. As a result, the main shoulder surfaces of the pin and the box can abut in a stable manner.

When the sealing surfaces and the shoulder surfaces of the pin and the box of a threaded joint come into intimate contact with the opposing surfaces by makeup of the threaded joint, the non-contacting region 13 which is located between the sealing surfaces and the shoulder surfaces becomes a closed space. The lubricating grease and the product fluid which are expelled from the intimately contacted sealing surfaces and shoulder surfaces flow into the closed space of the non-contacting region 13 and are confined therein. If the pressure of the fluid confined in the non-contacting region 13 becomes high due to an increased amount of the fluid, the non-contacting region 13 tends to radially expand due to the pressure, and there is the possibility of a deterioration in the gas tightness of the threaded joint which is achieved by the intimate contact between the sealing surfaces of the pin and the box.

Therefore, the threaded joint disclosed in Patent Document 1 has at least one groove which has a depth of at least 0.1 mm in the shoulder surface of at least one of the pin and the box and which functions as a leak path for high pressure fluid confined in the non-contacting region 13.

FIGS. 2A-2D are explanatory views showing grooves formed in a shoulder surface of a pin. As shown in this figure, groove portions 9a-1 and 9a-2 (which cooperatively form grooves 9a) are formed in the sub-shoulder surface 10 and the main shoulder surface 9, respectively, of a pin 1.

The grooves 9a run across both the main shoulder surface 9 and the sub-shoulder surface 10 of the pin 1. The grooves 9a may be formed in the shoulder surface of a box, or portion of the grooves 9a may be formed in a shoulder surface of the pin 1 with the remainder being formed in a shoulder surface of the box 2. The grooves 9a connect the non-contacting region 13 with the interior of the tubular threaded joint 0. Therefore, even if the fluid confined in the non-contacting region 13 produces a high pressure, the high pressure fluid can escape to the interior of the tubular threaded joint 0 through the grooves 9a, and the state of contact between the sealing surfaces 5 and 8 does not change, thereby maintaining the gas tightness of the threaded joint.

When performing makeup of a tubular threaded joint, a liquid lubricating grease containing a large amount of heavy metals has conventionally been applied each time makeup is carried out. From the standpoints of environment protection and working efficiency, tubular threaded joints having a surface coated with a solid lubricating coating which does not discharge pollutants such as heavy metals to the surroundings have been developed.

FIG. 3 is an explanatory view showing the coating structure formed on the surfaces of a tubular threaded joint disclosed in Patent Document 2, which is an example of a tubular threaded joint having such a solid lubricating coating. In a tubular threaded joint 15 which is constituted by a pin 1 and a box 2, the contact surface of the pin 1 has a preparatory surface treatment coating 18 which may optionally be provided on a steel substrate 17 for the purpose of surface roughening, and atop it a solid anticorrosive coating 19 based on a UV curable resin. The contact surface of the box 2 has a preparatory surface treatment coating 21 which may optionally be provided on the steel substrate 20 for the purpose of surface roughening and atop it a solid lubricating coating 22.

The solid lubricating coating 22 is a coating exhibiting plastic or viscoplastic rheological behavior in which the fluidity of the coating markedly varies with pressure. A coating having such properties can exhibit a higher galling resistance compared to a solid lubricating coating which does not have the above-described rheological behavior (such as a rigid coating made of a thermosetting resin containing a lubricating powder). In addition, this type of coating can exhibit a self-repairing function due to its fluidity, which is increased under pressure.

PRIOR ART DOCUMENTS

Patent Documents

Patent Document 1—WO 2009/060729 A
Patent Document 2—WO 2009/072486 A

SUMMARY OF THE INVENTION

The tubular threaded joint 0 disclosed in Patent Document 1 is premised on using a conventional liquid lubricating grease. In this case, even if the grooves 9a are filled with the liquid lubricating grease, the grooves are not clogged due to the fluidity of the grease. Namely, if the pressure of the fluid confined in the non-contacting region 13 is high, the fluid can escape into the interior of the tubular threaded joint through the grooves 9a, and the non-contacting region 13 is maintained at the same pressure as the interior of the threaded joint.

However, if a solid lubricating coating as disclosed in Patent Document 2 which exhibits plastic or viscoplastic rheological behavior is applied to the tubular threaded joint 0 disclosed in Patent Document 1, at the time of makeup of the threaded joint, there is the possibility of a portion of the solid lubricating coating which is extruded from the shoulder surface flowing into the grooves 9a, thereby causing the grooves 9a to be filled with the solid lubricating coating. If this occurs, due to the fact that the fluidity of the solid lubricating coating is much lower than that of liquid lubricating grease, the grooves are clogged and cannot function as a leak path. As a result, the pressure in the non-contacting region 13 is increased, resulting in a deterioration of the gas tightness of the threaded joint which is achieved by the sealing surfaces.

The object of the present invention is to provide a threaded joint for pipes which has a solid lubricating coating exhibiting plastic or viscoplastic rheological behavior formed on the contact surface of at least one of a pin and a box constituting the threaded joint and which has grooves formed in the shoulder surface wherein the grooves can be prevented from clogging, thereby preventing a decrease in the gas tightness of the threaded joint due to clogging of the grooves.

The present invention is a threaded joint for pipes comprising a pin and a box each having a contact surface including a threaded portion and an unthreaded metal contact portion, the unthreaded metal contact portion including a sealing surface and a shoulder surface, the shoulder surface of the pin being located on the end surface of the pin, a non-contacting region in which the pin and the box do not contact each other being present between the sealing surfaces and the shoulder surfaces of the pin and the box, the threaded joint having one or more grooves which are formed in the shoulder surface of at least one of the pin and the box and extend to the non-contacting region and the interior of the threaded joint, characterized in that at least the contact surface of at least one member of the pin and the box has a solid lubricating coating exhibiting plastic or viscoplastic rheological behavior formed thereon, and the total volume V ($mm^3$) of the grooves and the coating weight W (g) of the solid lubricating coating satisfy the following equation (1):

$$V/W \geq 24 \; (mm^3/g) \qquad (1).$$

It is advantageous to form the solid lubricating coating on the entire surface of the pin and/or box in order to facilitate the formation of the coating. The surface of a pin or a box means the surface facing the other member and generally extends from its threaded portion to the shoulder surface.

In a preferred embodiment of the threaded joint for pipes, the shoulder surfaces of the pin and the box each have a main shoulder surface and a sub-shoulder surface connected to the main shoulder surface. The main shoulder surface has a reverse angle of slope and extends to the interior of the threaded joint, and the sub-shoulder surface is located between the main shoulder surface and the non-contacting region and has an angle of slope with respect to a plane perpendicular to the pipe axis which is larger than that of the main shoulder surface. The area of the opening (upper end) of the grooves in the shoulder surface or in the main shoulder surface is preferably not greater than 40% the surface area of the shoulder surface or the main shoulder surface.

In a threaded joint for pipes according to the present invention which has a non-contacting region between a sealing surface and a shoulder surface and a groove which functions as a leak path when the pressure of the fluid confined in the non-contacting region becomes high, despite the presence of a solid lubricating coating exhibiting plastic or viscoplastic rheological behavior formed on the contact surface of at least one of a pin and a box, the groove is prevented from being filled with the lubricating coating, which can lead to malfunctioning of the groove as a leak path. As a result, it is possible to reliably prevent deterioration of the sealing performance and hence of the gas tightness of the threaded joint due to an overly increased pressure of the fluid confined in the non-contacting region. A threaded joint for pipes according to the present invention has improved galling resistance and rust preventing properties since the contact surface has a solid lubricating coating having plastic or viscoplastic rheological behavior.

MODES FOR CARRYING OUT THE INVENTION

The present invention will be explained while referring to the attached drawings. A threaded joint for pipes has a structure similar to the conventional threaded joint for pipes explained while referring to FIGS. 1A-1C, FIGS. 2A-2D, and FIG. 3, so in the following explanation, reference will be made to these figures.

Figure 1A:
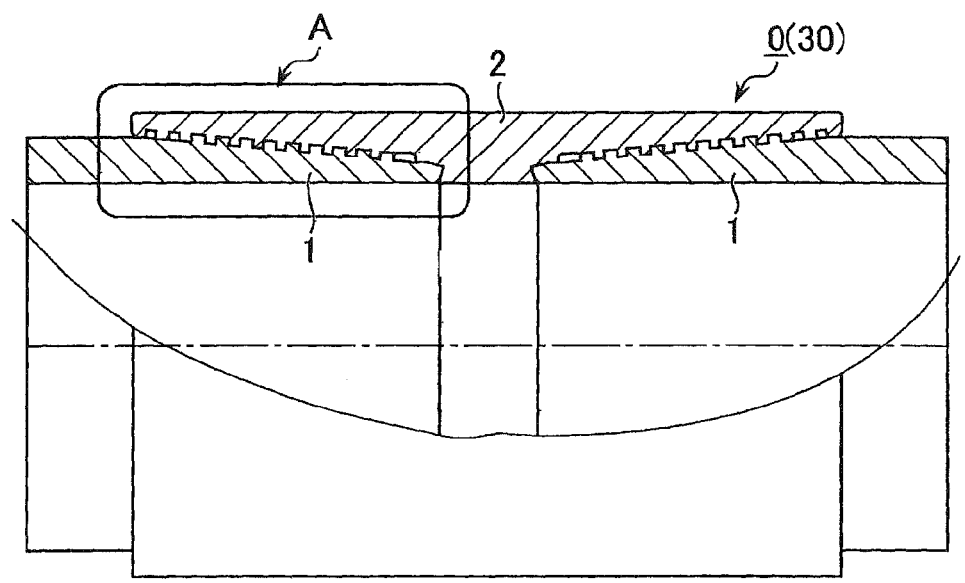
FIG. 1A is a cross-sectional view schematically showing the structure of a typical threaded joint for pipes.
Figure 1B:
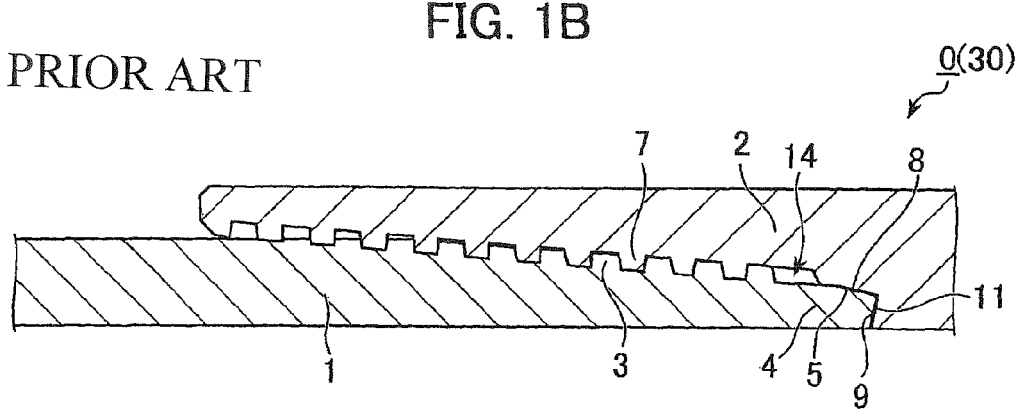
FIG. 1B is an enlarged schematic cross-sectional view of portion A in FIG. 1A.
Figure 1C:
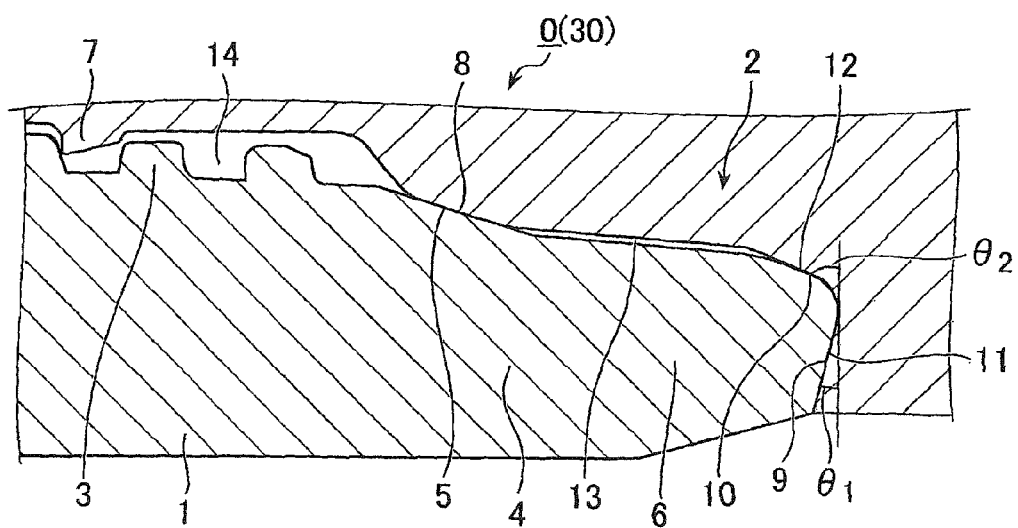
FIG. 1C is a partial schematic cross-sectional view in the vicinity of the lip portion of a threaded joint for pipes disclosed in Patent Document 1.

As shown by FIGS. 1A-1C, a threaded joint 30 for pipes according to the present invention is constituted by a pin 1, which is a joint element having male or external threads, and a box 2, which is a joint element having female or internal threads.

As shown in FIG. 1A, typical threaded joints for pipes are of the coupling type in which a pin 1 is formed on the outer surface of both ends of a steel pipe and a box 2 is formed on the inner surface of a coupling, which is a separate member. There are also integral threaded joints which do not use a coupling and in which one end of a steel pipe is made a pin 1 and the other end is made a box 2. A threaded joint 30 for pipes according to the present invention may be of any of these types. In the following explanation, the present invention will be explained with respect to a threaded joint 30 for pipes of the coupling type shown in FIG. 1A.

A threaded joint 30 for pipes according to the present invention is preferably applied to a steel pipe having a ratio (t/D) of the wall thickness t (mm) to the outer diameter D (mm) of at least 0.03 and at most 0.17. An example will be given of the case in which the wall thickness is 9-16 mm and the outer diameter is 9½ to 13½ inches.

The pin 1 and the box 2 each have contact surfaces which contact each other when the threaded joint is made up. The contact surface of the pin 1 includes a threaded portion 3 having male threads and an unthreaded metal contact portion located closer to the front end of the pin. The portion of the pin which is closer to the front end than the threaded portion 3 is a lip portion 4. The unthreaded metal contact portion formed on the lip portion 4 of the pin 1 comprises a sealing surface 5 located in the vicinity of the threaded portion 3 and a shoulder surface (also called a torque shoulder surface) formed on the end surface of the pin 1. Correspondingly, the box 2 has a threaded portion 7 having female threads, a sealing surface 8, and a shoulder surface.

With a usual premium joint, compressive performance of approximately 40 to 60% of the yield strength of the pipe body is demanded, and in some oil wells, compressive performance exceeding 80% is necessary. Of course, a compressive load is borne not only by the shoulders but also by the threaded portions, and if threads having a good ability to bear a compressive load are used, the load on the shoulders can be decreased to that extent. However, the thickness of the lip portion 4 (the wall thickness of the pin at the middle of the sealing surface 5) is made at least 25% and preferably at least 50% of the wall thickness of the pipe body so that the lip portion will have the resistance to compression demanded of it.

The greater are the thicknesses of the sealing surface of the pin, the greater is their ability to seal against external pressure. Therefore, a chamfer may be formed on the inner surface of the end of the lip portion in order to prevent turbulence by increasing circularity.

The shape of the sealing surfaces 5 and 8 of the pin 1 and the box 2 can be made a straight line which is sloped with respect to the joint axis or a curved line such as a circular arc (the former will be referred to as a frusto-conical surface and the latter will be referred to as a curved surface of rotation), or it can be a surface of rotation formed by rotating a line segment which is a combination of both lines around the joint axis (namely, a combination of a frusto-conical surface and a curved surface of rotation). Preferably, the sealing surface of one of the pin 1 and the box 2 is made a frusto-conical surface, and the sealing surface of the other is a curved surface of rotation or a combination of a curved surface of rotation and a frusto-conical surface. As a result, the sealing performance of the joint is increased, and it becomes difficult for galling to occur.

If the angle of slope of the sealing surfaces 5 and 8 with respect to the pipe axis is too steep, it leads to a decrease in the sealing contact pressure at the time of a tensile load, while if the slope is too gentle, it becomes easier for galling to occur due to an increase in the sliding distance. The slope angle of the sealing surfaces is in the range from 5° to 25° and preferably in the range from 10° to 20°. When tapered threads are employed, the slope angle of the sealing surfaces is larger than the slope angle of the threads 3, 7. For example, the slope angle of the threads is between 1° to 5° and preferably around 1.6°.

In the illustrated embodiment, as shown in FIG. 1C, the shoulder surface of the pin 1 has a two-level structure having a main shoulder surface 9 on the inner side and a sub-shoulder surface 10 on the outer side which is contiguous to the main shoulder surface. The main shoulder surface 9 is a reverse shoulder surface having a reverse angle of slope (sloping backwards toward the pipe center with respect to the pin insertion direction). Similarly, the shoulder surface of the box 2 also has a two-level structure having a main shoulder surface 11 and a sub-shoulder surface 12.

The contact surfaces of the pin and the box, i.e., the threaded portions, the sealing surfaces, and the shoulder surfaces thereof, are designed such that when the pin 1 is inserted into the box 2 and the threads are tightened until the shoulder surfaces contact each other with a predetermined torque, their sealing surfaces intimately contact each other with a predetermined interference to form a metal-to-metal seal. When the shoulder surfaces have a two-level structure comprising inner main shoulder surfaces and outer sub-shoulder surfaces as shown in FIG. 1C, tightening of the threads is carried out until the main shoulder surfaces contact each other with a predetermined torque.

The angle of slope $\theta_1$ of the main shoulder surfaces 9, 11 of the pin and the box with respect to a plane perpendicular to the pipe axis is smaller than the angle of slope $\theta_2$ of the sub-shoulder surfaces 10, 12. The radial dimension (wall thickness) of the main shoulder surfaces 9, 11 is larger than that of the sub-shoulder surfaces 10, 12. As a result, the main shoulder surfaces 9, 11 serve to withstand compressive stress applied during makeup of the threaded joint and also limit the radially inward deformation of the end of the lip 4, while the sub-shoulder surfaces 10, 12 serve to limit the radially outward deformation of the main shoulder surfaces when the main shoulders receive a compressive stress.

The angle of slope $\theta_1$ of the main shoulder surfaces 9, 11 with respect to a plane perpendicular to the pipe axis is preferably in the range of 5°-25° and more preferably 100-20°. The main shoulder surfaces have a reverse angle of slope, i.e., they slope backwards toward the pipe center with respect to the pin insertion direction, while the sub-shoulder surfaces slope forwards toward the pipe center with respect to the pin insertion direction. Preferably, the angle of slope $\theta_2$ of the sub-shoulder surfaces with respect to a plane perpendicular to the pipe axis is 60°-85°, namely, the sub-shoulder surfaces slope at an angle of 50-30° with respect to the pipe axis. The angle of slopes of the sub-shoulder surfaces 10, 12 is preferably larger than that of the sealing surfaces 5, 8. The wall thickness of the main shoulder surface 9 of the pin 1 is preferably larger than that of the sub-shoulder surface 10 by a factor of at least 1.5, more preferably by a factor of at least 2.5 and at most 6, and most preferably by a factor of at least 3 and at most 5.

The junction between the main shoulder surface 9 and the sub shoulder surface 10 of the pin 1 preferably forms a rounded apex with a radius of at most 1.5 mm. As a result, the contact area of the main shoulder surface and the sub shoulder surface can be maximized, and an increase in resistance to compression and suppression of deformation in the radial direction of the shoulder surface are achieved.

The details of the shape of a threaded joint for pipes are described in above-identified Patent Document 1. As described therein, the sub-shoulder surfaces 10, 12 sometimes do not contact each other when a threaded joint is made up, but they are considered as contact surfaces in the present invention.

More specifically, the geometric diametric interference (difference in diameter measured at a reference plane before tightening the pin and box) of the sub shoulder surfaces is made at most 1.1 times that of the sealing surfaces, and preferably it is made substantially equal to the geometric diametric interference of the sealing surfaces. The expression "substantially equal" allows a variation up to 5%.

By designing sub shoulder surfaces 10, 12 of the pin and the box so as to have nearly the same interference as that between the sealing surfaces 5, 8 in a normal tightened state, the entire lip of the pin will bends inwardly (decrease in diameter) due to the effect of the interference of the sealing surfaces of the pin and the box, and the sub shoulder surface of the pin will bend inwardly by at least the same amount as the interference of sealing surfaces, so contact will not take place between the sub shoulder surfaces of the pin and the box.

However, it is permissible for the sub shoulders 10, 12 to contact each other in a normal tightened state. In this case, the contact pressure of the sub shoulders is made at most 50% of the contact pressure of the sealing surfaces so as not to have an adverse effect on sealing properties.

The normal tightened state means that the pin and box of a threaded joint are tightened to reach a proper tightening torque which is prescribed by the manufacturer of the joint the according to the shape and material of the joint. In the normal tightened state, the shoulder surfaces (the main shoulder surfaces in the case of a threaded joint according to the present invention) of the pin and the box contact each other with a certain amount of interference without overall yield or extensive plastic deformation.

The present invention can be applied to a threaded joint for pipes in which each of the shoulder surfaces of the pin and the box does not have a sub-shoulder surface and is constituted by a main shoulder surface alone.

Figure 2A:
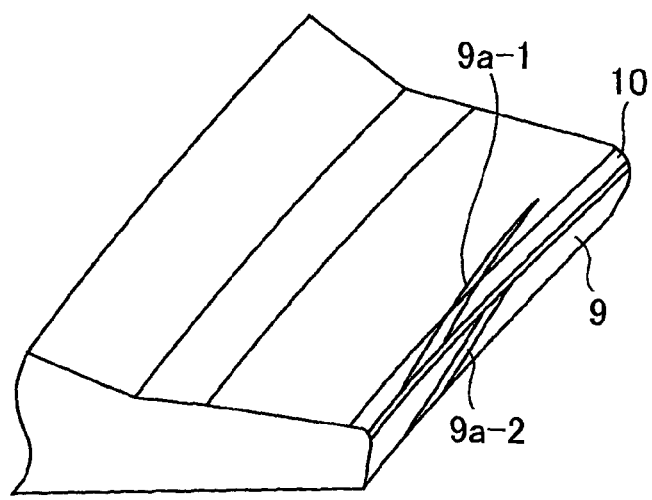
FIGS. 2A-2C are explanatory views showing grooves formed in the main shoulder surface and the sub-shoulder surface of a pin.
Figure 2B:
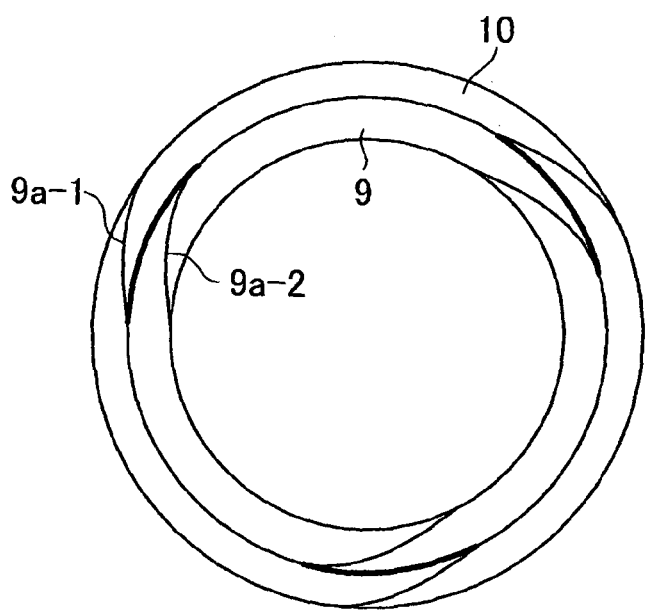
Figure 2C:
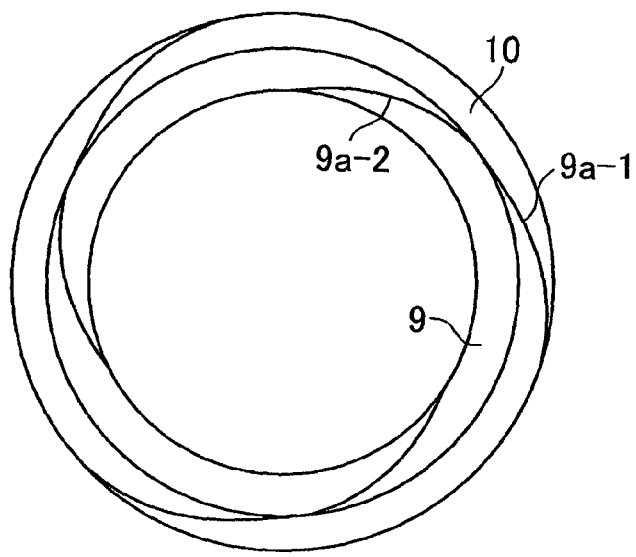

A threaded joint for pipe 30 according to the present invention has a non-contacting region 13 between the sealing surfaces 5, 8 and the shoulder surfaces (in the case of a two-level shoulder structure, the sub-shoulder surfaces which are closer to the sealing surfaces) of the pin and the box, and it also has one or more grooves formed in the shoulder surface of at least one of the pin and the box and extending to the non-contacting region 13 and to the interior of the threaded joint 30 (the inner end of the shoulder). When the shoulder surfaces of the pin and the box have a two-level structure, as shown in FIGS. 2A-2C for a pin shoulder surface, the groove is constituted by a groove portion 9a-1 formed on the outer sub-shoulder surface 10 (hereinafter referred to as an outer groove portion 9a-1) and a groove portion 9a-2 formed on the inner main shoulder surface 9 (hereinafter referred to as an inner groove portion 9a-2) which are connected to each other. The groove constituted by these two groove portions is referred to as a groove 9a.

The length of the non-contacting region 13 in the axial direction is selected so as to make it possible to achieve its above-mentioned object that the resistance to deformation of the sealing surfaces is increased. In the case of a pipe size which is used for oil country tubular goods (in the range of 50-550 mm in outer diameter), the axial length (longitudinal length) of the non-contacting region 13 is preferably in the range of about 4-20 mm. When the shoulder surfaces have the above-mentioned two-level structure, in view of the fact that the sub-shoulder surfaces may not contact each other, it is preferable that the total axial length of the non-contacting region 13 and the sub-shoulder surface 10, 12 be in the range of 4-20 mm. The dimension in the radial direction (perpendicular to the axial direction) of the non-contacting region 13 is preferably from 0.1 mm to 1 mm.

In the illustrated embodiment, the non-contacting region 13 is constituted by tapered surfaces of the pin and the box. In this case, the surface of this region of the box acts as a guide when the pin is inserted into the box, whereby the sealing surfaces of the pin and the box can be contacted in a stable manner, leading to an improvement in the sealing performance and galling resistance. The angle of slope of the tapered surfaces forming the non-contacting region with respect to the axial direction is preferably less than 10° and is smaller than the angle of slope of the sealing surfaces. The surfaces of the pin and the box forming the non-contacting region 13 may be cylindrical surfaces which are parallel to the pipe axial direction. By employing this shape, the wall thickness of the pin shoulder can be increased within the limited wall thickness of the steel pipe, thereby increasing the resistance to compression of the threaded joint.

In the illustrated embodiment, the groove 9a is formed in the shoulder surface of a pin. However, it may be formed in the shoulder surface of a box, or a portion of the groove 9a (e.g., a groove portion 9a-1 in the sub-shoulder surface) may be formed in a box and the remainder (e.g., a groove portion 9a-2 in the main shoulder surface) may be formed in a pin. The groove 9a provides communication between the non-contacting region 13 and the interior of the tubular threaded joint 0. Therefore, even if the pressure of the fluid in the non-contacting region 13 becomes high, the high pressure fluid can escape to the interior of the tubular threaded joint 0 through the groove 9a. In the illustrated embodiment, the groove portions 9a-1 and 9a-2 run helically (diagonally) in the shoulder surface.

Figure 2D:
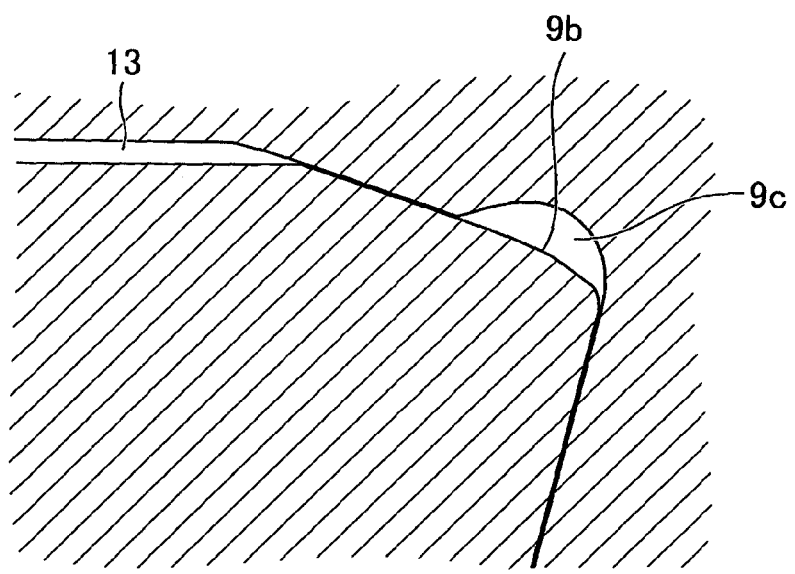
FIG. 2D is an enlarged longitudinal cross-sectional view in the vicinity of the border between the sub-shoulder surface and the main shoulder surface.

In order to achieve the above-described function, when the shoulder surface of each of the pin and the box has a main shoulder surface and a sub-shoulder surface, the outer groove portion 9a-1 formed in the sub-shoulder surface and the inner groove portion 9a-2 formed in the main shoulder surface must communicate with each other. For this purpose, as shown in FIG. 2D, a depression 9c can be provided to form a connecting channel in the circumferential direction of the rearmost portion of the shoulder of the box 2 opposing the apex 9b of the shoulder surfaces 9 and 10 of the pin 1 (the portion connecting the main shoulder surface 9 and the sub-shoulder surface 10 of the pin 1) at least from a point opposing the inner end of the outer groove portion 9a-1 to a point opposing the outer end of the inner groove portion 9a-2 (as shown by bold lines in FIG. 2B). In this manner, groove portions 9a-1 and 9a-2 are connected through the depression 9c provided in the box along the apex 9b of the pin. Alternatively, a connecting channel between groove portions 9a-1 and 9a-2 can be achieved by forming a chamfer or a depression along the apex 9b at least from the inner end of the outer groove portion 9a-1 to the outer end of the inner groove portion 9a-2. Such a connecting channel may be formed around its entire circumference. In order to avoid clogging, the connecting channel preferably has a cross-sectional area which is at least twice and more preferably at least three times the cross-sectional area of the groove portions 9a-1 and 9a-2.

As shown in FIG. 2C, the outer groove portion 9a-1 and inner groove portion 9a-2 may be directly connected, with the inner end of the outer groove portion 9a-1 adjoining the outer end of the inner groove portion 9a-2. This arrangement makes it unnecessary to form a connecting channel like that described above, but as shown in FIG. 2A, providing the outer and inner groove portions 9a-1 and 9a-2 in the same position in the circumferential direction makes groove cutting (forming the grooves) somewhat easier. In either case, cutting of the groove portions 9a-1 and 9a-2 can be carried out using a NC (numerical control) lathe system, for example.

In another embodiment of the invention, the outer groove portion 9a-1 and the inner groove portion 9a-2 do not extend diagonally as shown in FIGS. 2A-2C but extend in the radial direction, and preferably the two groove portions extending in the radial direction are directly connected to each other. In this manner, the length of each groove portion is minimized, fluid can easily escape, and groove cutting can be carried out without using a NC lathe. However, it is necessary to use a special groove cutting apparatus.

In the embodiment shown in FIGS. 2B and 2C, in order to guarantee communication between the non-contacting region 13 and the interior of the tubular threaded joint, the groove 9a is provided at three equally spaced locations in the circumferential direction. It is sufficient for the groove 9a to be provided in at least one location, and there is no particular upper limit on the number of locations of the groove 9a, but normally 8 or fewer locations are sufficient. The pin 1 preferably has 2-4 such grooves 9a.

There is no particular limitation on the cross-sectional shape of the groove 9a, but it should have a cross-sectional area such that fluid can pass through it. The depth of each groove 9a is at least 0.1 mm and preferably at least 0.2 mm. In order to prevent a marked decrease in the performance of a threaded joint under compression due to a decrease in the contact surface area of the main shoulder surface 9 caused by the formation of the grooves 9a, the length in the circumferential direction of the inner groove portion 9a-1 and the outer groove portion 9a-2 is preferably such that each of the groove portions 9a-1 and 9a-2 extends by at most 180° around the periphery of the shoulder surface. For example, as shown in FIG. 2B or 2C, in the case in which 3 groove portions 9a-1 and 9a-2 are provided in the main shoulder surface 9 and the sub-shoulder surface 10, respectively, each groove portion 9a-1 and 9a-2 preferably has a length along a circular arc measuring at most 180° and more preferably at most 120°.

As stated above, the threaded portions 3 and 7, the sealing surfaces 5 and 8, and the shoulder surfaces 9, 10 and 11, 12 of the pin 1 and the box 2, respectively, constitute the contact surfaces of a threaded joint 30 for pipes. The threaded joint is required to have properties such as galling resistance, gas tightness, and corrosion resistance. For this purpose, in the past, lubricating grease such as compound grease which contains heavy metal powder was applied to the contact surface of at least one of the pin and the box before each time that makeup of the threaded joint was carried out. However, such application had problems from the standpoints of the environment protection and working efficiency.

Figure 3:
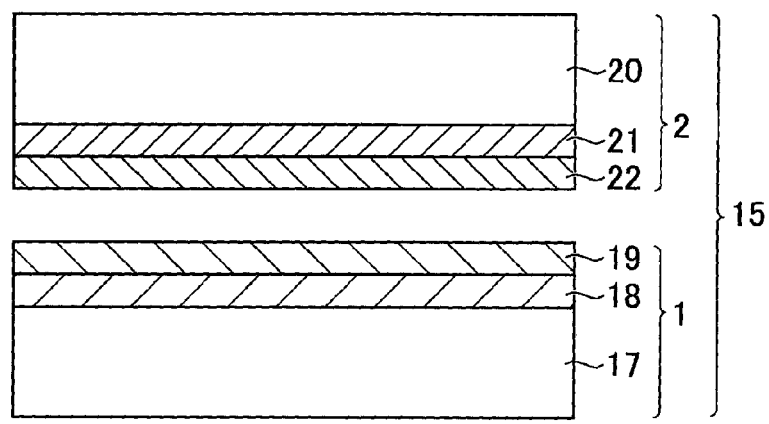
FIG. 3 is an explanatory view showing the coating structure formed on the contact surfaces of a pin and a box.

As shown in FIG. 3, a threaded joint for pipes according to the present invention has a solid lubricating coating 22 exhibiting plastic or viscoplastic rheological behavior on at least the contact surface of at least one of the pin 1 and the box 2. A coating which exhibits such rheological behavior does not flow at atmospheric pressure but can flow under a high pressure. Namely, the fluidity of the coating markedly varies depending on the pressure. As a result, it is possible to impart improved galling resistance, gas tightness, and corrosion resistance to the threaded joint, thereby making it possible to perform makeup of the joint without application of lubricating grease and to protect the surface of the threaded joint from rusting.

A solid lubricating coating means a coating which is solid at ambient temperature, and specifically it means a coating which is solid at 40° C. or below. The term plastic as used herein means the property of a material which produces a time-independent permanent deformation when receiving a stress. The term viscoplastic means the property of a material which produces a time-dependent permanent deformation when receiving a stress. A solid lubricating coating exhibiting plastic or viscoplastic rheological behavior exhibits the behavior that the fluidity of the coating significantly varies depending on the pressure while it is in a solid state.

In the embodiment shown in FIG. 3, the surface of the pin 1 has a preparatory surface treatment coating 18 for surface roughening on the steel substrate 17 and a solid anticorrosive coating 19, and the surface of the box 2 has a preparatory surface treatment coating 21 on the steel substrate 20 for surface roughening and a solid lubricating coating 22. In order to make the drawings easier to interpret, the solid lubricating coating 22 and other coatings are omitted from FIGS. 1 and 2.

The solid lubricating coating 22 may be formed on the surface of one of the pin and the box as shown in FIG. 3. In this case, the coating which is formed on the surface of the other member is not limited to a solid anticorrosive coating and may be a solid lubricating coating which does not exhibit plastic or viscoplastic rheological behavior (e.g., a coating containing a solid lubricant dispersed in a thermosetting resin such as an epoxy resin). Alternatively, on the surface of the other member, no coating may be formed or only a preparatory surface treatment coating may be formed. Generally, a solid lubricating coating, a solid anticorrosive coating, and a preparatory surface treatment coating are formed on the entire surface of the pin or the box, but such a coating may be omitted from the portion of the surface other than the contact surface (such as the portion of the non-contacting region 13).

Below, the various coatings shown in FIG. 3 will be explained.

Preparatory Surface Treatment

The contact surfaces of the pin 1 and the box 2 of a threaded joint 30 (the threaded portions, the sealing surfaces, and the shoulder surfaces) are formed by cutting operations including thread cutting, and their surface roughness is generally around 3-5 µm. If the surface roughness of the contact surfaces is made larger than this, the adhesion of the coating which is formed atop them can be increased, and as a result, properties such as galling resistance and corrosion resistance can be improved. For this reason, preparatory surface treatment which can increase the surface roughness is preferably carried out prior to forming a coating on the contact surfaces of at least one and preferably both of the pin 1 and the box 2.

One type of such preparatory surface treatment is the formation of a preparatory coating 18, 21 having an increased surface roughness. This formation can be carried out by chemical conversion treatments such as phosphate treatment, oxalate treatment, or borate treatment which forms a coating of acicular crystals which increase the surface roughness or by blasting iron balls coated with zinc or a zinc alloy to form a porous zinc-based coating.

Other types of preparatory surface treatment include shot or grit blasting treatment and pickling. These treatments can increase the surface roughness of the substrate itself, and no preparatory surface treatment coating is formed.

Although having no surface roughening effect, metal plating capable of increasing the adhesion of a solid lubricating coating or a solid anticorrosive coating can be employed as preparatory surface treatment. The metal plating may be multi-layer plating forming two or more layers.

The preparatory surface treatment generally forms a coating having a uniform thickness on the surface of a threaded joint, and the shape of the groove 9a is substantially maintained after the preparatory surface treatment.

Solid Anticorrosive Coating

A solid anticorrosive coating has the requirements that it not easily be destroyed under the force applied when mounting a protector for protecting the contact surface of a pin or a box until the on-site operation for makeup of the threaded joint, that it not dissolve when exposed to condensed water during transport or storage, and that it not easily soften even at high temperatures exceeding 40° C.

A solid anticorrosive coating having such properties can be formed from a thermosetting resin, but preferably it is a coating of a UV curable resin. Because a UV curable resin coating is generally highly transparent, it is preferably formed on the contact surface of a pin. The pin which is typically formed on the exterior surface of the ends of a steel pipe is more susceptible to damage than the box during transportation. Therefore, at the time of makeup, the surface of the pin, and particularly the surface of the threaded portion thereof is frequently checked by visual inspection for the presence or absence of damage. A UV curable resin coating does not obstruct such visual inspection and makes it possible to inspect from atop the coating without removing it.

The thickness of a solid anticorrosive coating is generally in the range of 5-50 m and preferably in the range of 10-30 µm. The solid anticorrosive coating is formed generally uniformly on the surface of a threaded joint including a groove and a threaded portion and has a strong adhesion in order to protect the surface of the threaded joint during transport and storage. Therefore, there is little possibility of its filling the aforementioned grooves 9a in the shoulder surface and inhibiting the function of the grooves as a leak path.

Further details of a UV curable resin coating are found in above-identified Patent Document 2.

Solid Lubricating Coating

In the present invention, a solid lubricating coating which exhibits plastic or viscoplastic rheological behavior and which is capable of affording improved galling resistance, gas tightness, and rust-preventing properties to a threaded joint for pipes is formed on the contact surface of at least one of the pin and the box. When a UV curable resin coating is formed on the contact surface of the pin as a solid anticorrosive coating as mentioned above, the solid lubricating coating is formed on the contact surface of the box. Although the solid lubricating coating exhibiting plastic or viscoplastic rheological behavior is explained in detail in Patent Document 2, a brief explanation is given below.

This type of solid lubricating coating is typically a coating containing a small amount of a solid lubricant dispersed in a matrix exhibiting plastic or viscoplastic rheological behavior. A preferred solid lubricating coating comprises 70-95 mass % of a matrix and 5-30 mass % of a solid lubricant. Since the proportion of the solid lubricant is small, the coating as a whole exhibits the plastic or viscoplastic rheological behavior characteristic of the matrix.

The matrix preferably has a melting point in the range of 80-320° C. As a result, it is possible to form a solid lubricating coating by spray coating of a molten composition at a temperature of at least the melting point of the matrix using a usual spray gun. The matrix preferably comprises a thermoplastic polymer, a wax, and a metal soap, and more preferably it further contains a corrosion inhibitor and a water-insoluble liquid resin.

The thermoplastic polymer which is used in the matrix is preferably polyethylene. Polyethylene has a relatively low melting point, so hot melt spray coating can be carried out at a temperature of 150° C. or below, and the coating which is formed has excellent lubricating properties.

The metal soap is a soap of a higher fatty acid (a fatty acid having at least 12 carbon atoms) and a metal other than an alkali metal. The metal soap provides the effect of capturing shards which develop at the time of makeup or breakout of a threaded joint and suppressing their discharge to the external environment. In addition, it has the effect of increasing the lubricity of the coating by decreasing the coefficient of friction, and it also has a corrosion inhibiting effect. Preferred metal soaps are zinc stearate and calcium stearate.

Wax performs functions like those performed by a metal soap. Accordingly, it is possible to contain just one of a metal soap and a wax in the solid lubricating coating, but it is preferable for the solid lubricating coating to contain both a metal soap and a wax because containing both improves the lubricating properties of the coating. A wax has a low melting point and hence has the advantage that it lowers the melting point of the coating composition and accordingly the temperature for spray coating. The wax can be any of animal, vegetable, mineral, and synthetic waxes. A particularly preferred wax is carnauba wax.

The mass ratio of the wax to the metal soap is preferably in the range of 0.5-3 parts of wax with respect to one part of metal soap. This mass ratio is more preferably 0.5-2 and most preferably approximately 1.

Corrosion inhibitors of the type which have conventionally been added as corrosion inhibitors to lubricating oils are preferred because they have excellent lubricating properties. Representative examples of this type of corrosion inhibitor include a calcium sulfonate derivative sold by The Lubrizol Corporation under the trade name Alox™ 606, a strontium zinc phosphosilicate sold by Halox under the trade name Halox™ SZP-391, and NA-SUL™ Ca/W1935 manufactured by King Industries, Inc. The presence of a corrosion inhibitor in the solid lubricating coating makes it possible to prevent corrosion of the contact surfaces to a certain extent just by the solid lubricating coating even if a solid anticorrosive coating is not formed atop it. For this purpose, the solid lubricating coating preferably contains at least 5 mass % of a corrosion inhibitor.

The water-insoluble liquid resin (a resin which is liquid at room temperature) increases the fluidity of the coating composition in a molten state, thereby reducing problems during spray coating. If present in a small amount, the liquid resin does not produce tackiness of the resulting solid lubricating coating. Preferred liquid resins are selected from a poly(alkyl methacrylate), polybutene, polyisobutene, and a polydialkylsiloxane (liquid silicone resins, such as polydimethylsiloxane. Liquid polydialkylsiloxanes also function as a surfactant.

In addition to the above-described components, the matrix may contain small amounts of other additives selected from surfactants, colorants, antioxidants, and the like. The matrix may also contain an extreme pressure agent, a liquid lubricant, or the like in an extremely small amount of at most 2 mass %.

An example of a preferred composition (mass %) of the matrix of the solid lubricating coating is as follows:
  5-40% of a thermoplastic polymer,
  5-30% of a wax,
  5-30% of a metal soap,
  0-50% of a corrosion inhibitor,
  0-17% of a water-insoluble liquid resin,
  0-2% each of a surfactant, a colorant, and an antioxidant, and
  0-2% each of an extreme pressure agent and a liquid lubricant.

For each component, two or more materials can be used.

An example of a more specific composition (mass %) of the matrix of a preferred solid lubricating coating is as follows:
  5-40% of a polyethylene homopolymer,
  5-30% of carnauba wax,
  5-30% of zinc stearate,
  5-50% of a corrosion inhibitor,
  0-15% of a poly(alkyl methacrylate),
  0-2% of poly(dimethylsiloxane),
  0-2% of a colorant, and
  0-1% of an antioxidant.

A solid lubricant which is dispersed in the matrix means a powder having lubricating properties. Preferably one or more solid lubricants selected from graphite, zinc oxide, boron nitride, molybdenum disulfide, tungsten disulfide, graphite fluoride, tin sulfide, bismuth sulfide, polytetrafluoroethylene (PTFE) and polyamides can be used.

In addition to a solid lubricant, the solid lubricating coating may contain an inorganic powder for adjusting sliding properties. Examples of such an inorganic powder are tungsten disulfide and bismuth oxide. The inorganic powder can be contained in the solid lubricating coating in an amount up to 20 mass %.

The solid lubricating coating is preferably formed by the hot melt method. This method is carried out by heating a coating composition (containing the above-described matrix and a powder of a solid lubricant) to melt the matrix, and spraying the composition in a molten state from a spray gun having a temperature maintaining capability. The heating temperature of the composition is preferably a temperature which is 10-50° C. higher than the melting point of the matrix.

The substrate which is coated (such as the contact surface of a box) is preferably preheated to a temperature higher than the melting point of the matrix. By performing preheating, good coatability can be obtained. Alternatively, when the coating composition contains a small amount (such as at most 2 mass %) of a surfactant such as Polydimethylsiloxane, it is possible to form a good coating without preheating the substrate or by preheating it to a temperature lower than the melting point of the matrix.

The coating composition is melted by heating in a tank equipped with a suitable stirring device, and the molten composition is supplied by a compressor to the spraying head (which is maintained at a predetermined temperature) of a spray gun through a metering pump and sprayed at the substrate. The temperature at which the inside of the tank and the spraying head are maintained is adjusted in accordance with the melting point of the matrix of the composition.

The coating thickness of the solid lubricating coating is preferably in the range of 10-150 μm and more preferably in the range of 25-80 μm. If the coating thickness of the solid lubricating coating is too small, the lubricating properties of the threaded joint for pipes of course become inadequate, and galling easily takes place at the time of makeup or breakout. Furthermore, although the solid lubricating coating has a certain degree of corrosion resistance, if the coating thickness is too small, the corrosion resistance becomes inadequate. Making the coating thickness of the solid lubricating coating too large not only wastes the lubricant but runs counter to preventing environmental pollution. In addition, slippage sometimes takes place at the time of makeup, and makeup may become difficult. In the present invention, the coating thickness of the solid lubricating coating is limited so as to satisfy below-described equation (1).

When either the solid lubricating coating or the anticorrosive coating is formed atop a contact surface having an increased surface roughness as a result of preparatory surface treatment, the coating thickness is preferably larger than the roughness Rz of the substrate. If this is not the case, the coating sometimes cannot completely cover the substrate. The coating thickness when the substrate is rough is the average value of the coating thickness of the entire coating, which can be calculated from the area, the mass, and the density of the coating.

A threaded joint for pipes according to the present invention satisfies the relationship between the total volume V (mm$^3$) of the grooves 9a and the coating weight W (g) of the solid lubricating coating 22 given by the following equation (1), preferably given by the following equation (1'), and more preferably given by the following equation (1"):

$$V/W \geq 24 \text{ (mm}^3\text{/g)} \tag{1}$$

$$V/W \geq 25 \text{ (mm}^3\text{/g)} \tag{1'}$$

$$V/W \geq 28 \text{ (mm}^3\text{/g)} \tag{1"}$$

The total volume V of the grooves is the total volume of the grooves 9a (groove portions 9a-1 and 9a-2 in the case of grooves having a two-level structure) formed in the shoulder surfaces of the pin and the box, and when there are two or more grooves, it is the sum of the volumes of all the grooves. When there are plural grooves having the same shape, the total volume of the grooves can be determined by the equation: (cross-sectional area of one groove)×(length of one groove)×(number of grooves).

The coating weight W of the solid lubricating coating is the amount in mass of the solid lubricating coating deposited on the surfaces of a threaded joint, namely, the opposing surfaces of the pin and the box thereof. When both the pin and the box have the solid lubricating coating, the coating weight is the sum of the coating weight of the pin and that of the box. Namely, the coating weight of the solid lubricating coating is the amount per threaded joint. The coating weight of the solid lubricating coating per threaded joint can be determined by preparing a dummy sample of the threaded joint with the same size using a lightweight material such as paper, for example, applying the same coating composition to the dummy sample under the same conditions as used to form the solid lubricating coating on the real threaded joint, and calculating the weight difference of the dummy sample before and after the application.

In a threaded joint for pipes according to the present invention, the solid lubricating coating formed on a contact surface thereof flows under the heavy stress applied at the time of makeup due to its plastic or viscoplastic nature, and a considerable portion of the solid lubricating coating on the sealing surface and the shoulder surface is forced out to the surroundings. Part of the dislodged solid lubricating coating enters the non-contacting region 13. If the pressure of the fluid entering the non-contacting region 13 becomes high, there is a possibility of the gas tightness of the threaded joint achieved by the sealing surfaces being lowered. In order to eliminate this possibility, a groove 9a which communicates with the non-contacting region 13 is formed in the shoulder surface and functions as a leak path.

However, if the coating weight of the solid lubricating coating is too great, the solid lubricating coating fills the groove 9a formed in the shoulder surface. Since the heavy stress produced by makeup is not applied to the inside of the groove 9a, the solid lubricating coating in the groove can hardly flow. Therefore, the groove becomes clogged with the solid lubricating coating and can no longer function as a leak path, leading to blockage of the non-contacting region. As a result, a high pressure fluid is confined in the non-contacting region 13, leading to a deterioration in the gas tightness of the threaded joint.

Figure 4:
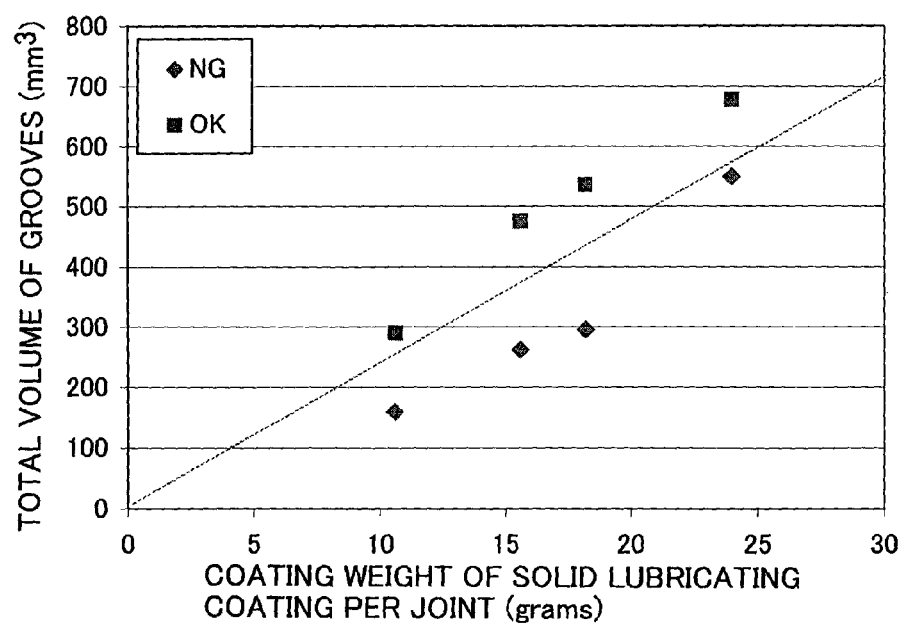
FIG. 4 is a graph showing the relationship between the total volume of grooves and the coating weight of a solid lubricant obtained in a seal test.

FIG. 4 is a graph showing the relationship between the total volume of the grooves 9a and the coating weight of the solid lubricant on a threaded joint obtained in a seal test which is explained in the example. In this figure, NG indicates that blockage of the non-contacting region occurs, and OK indicates no occurrence of this blockage.

As shown in the graph of FIG. 4, as the total volume of the groove increases, the maximum coating weight of the solid lubricating coating at which the occurrence of blockage of the non-contacting region is avoided increases. It can be seen from this graph that blockage of the non-contacting region 13 due to clogging of the grooves 9a can be prevented if the total volume of the grooves 9a and the coating weight of the solid lubricating coating satisfy above formula (1). Even if the solid lubricating coating is not formed on the surface in the non-contacting regions 13, 14, due to the proportion in area of these regions which is very limited among the total surface area of the threaded joint, satisfaction of the above formula (1) is sufficient to prevent a high pressure fluid from being confined in the non-contacting region 13.

The volume of a groove depends on its width of the opening at the upper end (groove width), its depth, and its cross-sectional shape. In the case of a V-shaped groove, the width and depth of a groove depend on the tip angle of a cutting tool used in groove cutting. Therefore, when the coating weight required to provide a threaded joint with desired galling resistance and rust-preventing properties is known, the shape of a groove (groove cutting angle, the width, depth, and length of a groove) and the number of grooves can be determined so as to satisfy above equation (1).

As the total volume of the grooves 9a is increased, the contact area of the shoulder surfaces (the area of the shoulder surfaces which contact each other) necessarily decreases because the grooves do not contact the opposing surface. Because the shoulder surfaces (the main shoulder surfaces in the case of the above-described two-level structure) provide the torque performance (perform the role of supporting the torque and compressive load), an excessive decrease in the contact area of the shoulder surfaces results in a deterioration in torque performance.

Figure 5:
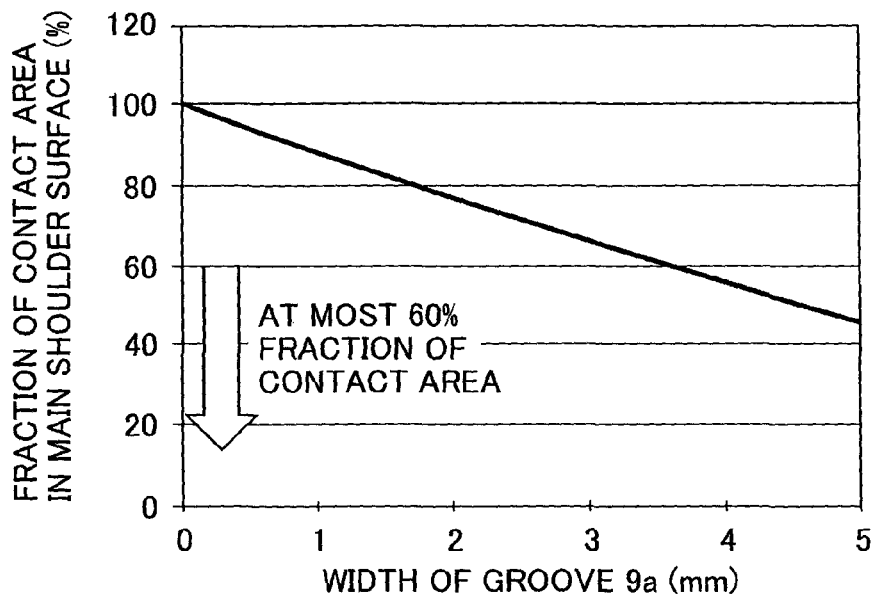
FIG. 5 is a graph showing variations in the contact area of a main shoulder surface as a function of the width of grooves in a threaded joint for pipes disclosed in Patent Document 1 having two-level shoulder surfaces with grooves formed thereon and having an outer diameter of 10¾" (27.3 cm) and a nominal weight of 60.7 lb/ft (90.4 kg/m).

FIG. 5 is a graph showing the relationship between the width of grooves (mm) and the area fraction of the contact area of a main shoulder surface in a threaded joint for pipes disclosed in Patent Document 1 having two-level shoulder surfaces with three grooves 9a formed thereon and having an outer diameter of 10¾" (27.3 cm) and a nominal weight of 60.7 lb/ft (90.4 kg/m), which is an indicator of the wall thickness It was found that in order to guarantee the torque performance required for the main shoulder surfaces, it is desirable that the area fraction of the contact area be at least 60%, in other words, that the area fraction occupied by the openings at the upper ends of the grooves 91 in the main shoulder surface in which the grooves are formed be less than 40%. As can be seen from FIG. 5, in the case of a threaded joint for pipes having the above-mentioned shape, if the width of the grooves 9a-1 is 3.6 mm or smaller, the area fraction of the contact area of the main shoulder surfaces is at least 60%. For a threaded joint for pipes having a different shape, the upper limit for the groove width can be determined in the same manner. In the case of a threaded joint which does not have a two-level structure, the area fraction occupied by the openings of the groove or grooves in the entire shoulder surface is preferably less than 40%.

The following example is intended to illustrate the present invention without limiting it.

EXAMPLE

A seal test (a test in which an internal and external pressure are applied to a threaded joint while a tensile load and a compressive load are applied thereto) was carried out using threaded joints for pipes having the dimensions shown in Table 1. The threaded joints had the shape shown in FIGS. 1A-1C and FIGS. 2A and 2B with grooves 9a formed on the shoulder surfaces having the width and depth shown in Table 1.

The pin 1 and the box 2 of each of the threaded joints for pipes being tested had contact surfaces constituted by threaded portions 3,7, sealing surfaces 5, 8, and shoulder surfaces, and formed a non-contacting region 13 between the sealing surfaces and the shoulder surfaces. The axial length of the sealing surfaces was 3-5 mm and that of the non-contacting region was 5-15 mm. As shown in FIG. 1C, the shoulder surfaces had main shoulder surfaces 9, 11 and sub-shoulder surfaces 10, 12. The radial thickness (in the direction perpendicular to the pipe axis) of the main shoulders was 2-6 times that of the sub-shoulders. The angle of slope $\theta_2$ of the sub-shoulder surfaces was 65-750, and the angle of slope $\theta_1$ of the main shoulder surfaces was 10-20° with respect to a plane perpendicular to the pipe axis. As shown in FIGS. 2A and 2B, each of the main shoulder surface 9 and the sub-shoulder surface 11 of the pin 1 had the groove 9a or more specifically groove portions 9a-2 and 9a-1, respectively, at three locations. Each groove portion extends 50-75° in the circumferential direction. As shown in FIG. 2D, the groove portions 9a-1 and 9a-2 of each pair were connected by a connecting channel 9c formed in the portion of the shoulder surface of the box 2 opposing the apex 9b of the shoulder surface of the pin 1.

On the surface of the pin 1 which was finished by machine grinding (surface roughness of 3 μm), a zinc phosphate coating having a surface roughness of 8 μm was formed with a thickness of 8 μm, and atop it a commercially available UV curable resin coating composition (ThreeBond 3113B manufactured by ThreeBond Co., Ltd., which is a solventless UV curable resin coating composition based on an epoxy resin) was applied by spraying and cured by irradiation with UV light to form a UV cured resin coating having a thickness of 25 μm. This resin coating was transparent and the male threads of the pin could be inspected by observation with the naked eyes or through a magnifying glass from atop the coating.

On the surface of the box 2 which was finished by machine grinding (surface roughness of 3 μm), a manganese phosphate coating having a surface roughness of 10 μm was formed with a thickness of 12 μm. A lubricating coating composition having the composition shown below was heated at 150° C. in a tank equipped with a stirrer to form a melt having a viscosity suitable for application. The box surface treated in the above-described manner was preheated to 130° C. by induction heating, and the molten lubricating coating composition was applied thereto using a spray gun having a spray head capable of maintaining the temperature. The amount of the coating composition being applied was set to the amount sufficient to form a coating having a thickness of 50 μm taking the surface area of the box into consideration. During the application, the coupling which constituted the box was rotated at a constant circumferential speed. Upon cooling, a solid lubricating coating exhibiting viscoplastic rheological behavior was formed. The coating weight of the solid lubricating coating was determined as the weight difference before and after application when the same coating composition was applied to a dummy box made of paper under the same conditions. The coating weight of the solid lubricating coating is shown in Table 1 along with the calculated value of the total volume of grooves 9a divided by the coating weight.

Composition of the lubricating coating composition:
9% polyethylene homopolymer (Licowax™ PE 520 manufactured by Clariant);
15% carnauba wax;
15% zinc stearate;
5% liquid polyalkyl methacrylate (Viscoplex™ 6-950 manufactured by Rohmax);
40% corrosion inhibitor (ALOX™ 606 manufactured by Lubrizol);
3.5% graphite fluoride;
1% zinc oxide;
5% titanium dioxide;
5% bismuth trioxide;
1% silicone (polydimethylsiloxane); and
antioxidant (manufactured by Ciba-Geigy) consisting of 0.3% Irganox™ L150 and 0.2% Iragafos™ 168.

Figure 6:
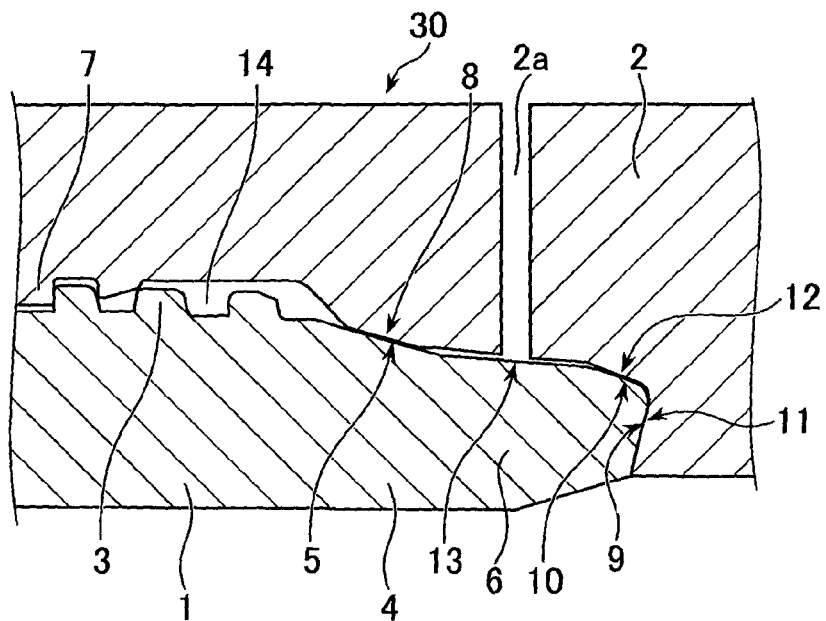
FIG. 6 is an explanatory view showing a method of measuring the pressure inside a non-contacting region.

In the seal test, the variation in the pressure inside the non-contacting region 13 was measured. As shown in FIG. 6, this measurement was carried out by forming a drill hole 2a which passed through only the box 2 to reach the non-contacting region 13 and measuring the pressure in that region.

The seal test was carried out under conditions in accordance with ISO 13679:2002, Series A and Series B (ambient temperature and high temperature). ISO 13679:2002 is an international standard for tests on joints for oil country tubular goods and comprises the following three types of seal tests which test the gas tightness of a joint under various loads and temperatures and the make-break test which tests how many times a joint can undergo makeup and breakout.

Series A: Internal and external pressures are applied in a state in which a tensile/compressive load is applied to a joint in a made-up state.

Series B: An internal pressure is applied in a state in which a tensile/compressive/bending load is applied to a joint in a made-up state.

Series C: A heat cycle is applied to a joint in a made-up state under tension and an internal pressure.

In this example, as a result of carrying out a Series A test followed by a Series B test on the same threaded joint, the occurrence or non-occurrence of confinement of a high pressure fluid in the non-contacting region was determined based on the variation in the pressure inside the region as described below.

All the threaded joints for pipes being tested were made of P110 carbon steel. P110 carbon steel conforms to the API specification 5CT (ISO 11960:2004) which is an international standard for oil country tubular goods. The specifications relating to a threaded joint are a yield stress of 110-140 psi and a tensile strength of at least 125 psi.

The grooves 9a were formed into a V shape with a depth of 0.4 mm, 0.6 mm, or 0.8 mm using a cutting tool having a tip angle of 35° or 55°. The width at the opening of each of these grooves is shown in Table 1. The area fraction of the main shoulder surface of the pin occupied by the grooves 9a (at their openings) was calculated from the width and length of each groove and the number of grooves. As shown in Table 1, for any of the threaded joints being tested, the area fraction occupied by the openings of the grooves was less than 40%, so the area fraction of the contact surface was at least 60%.

In order to evaluate whether a high pressure fluid was confined in the non-contacting region 13, the pressure in this region and the pressure inside the threaded joint for pipes were recorded. When a difference between the two pressures appeared such that the pressure inside the non-contacting region did not decrease even though the pressure inside the threaded joint was decreasing, it was determined that high pressure fluid was confined inside the non-contacting region. The test results are shown in Table 1.

TABLE 1

| Dimensions of steel pipes | | Shape of grooves | | Coating weight of solid lubricant (g/joint) | V/W* (mm³/g) | Confinement of high pressure fluid | Area fraction of grooves** (%) |
|---|---|---|---|---|---|---|---|
| Outer diameter (inches) | Nominal weight (lb/ft) | Depth (mm) | Width (mm) | | | | |
| 7 | 29 | 0.4 | 2.21 | 10.6 | 15.1 | Yes | 24.5 |
| 7 | 29 | 0.6 | 2.9 | 10.6 | 27.3 | No | 30.7 |

TABLE 1-continued

| Dimensions of steel pipes | | Shape of grooves | | Coating weight of solid lubricant (g/joint) | V/W* (mm³/g) | Confinement of high pressure fluid | Area fraction of grooves** (%) |
|---|---|---|---|---|---|---|---|
| Outer diameter (inches) | Nominal weight (lb/ft) | Depth (mm) | Width (mm) | | | | |
| 9.625 | 53.5 | 0.4 | 2.21 | 15.6 | 16.8 | Yes | 22.8 |
| 9.625 | 53.5 | 0.6 | 2.9 | 15.6 | 30.5 | No | 29.1 |
| 10.75 | 60.7 | 0.4 | 2.21 | 18.2 | 16.2 | Yes | 23.6 |
| 10.75 | 60.7 | 0.6 | 2.9 | 18.2 | 29.4 | No | 30.2 |
| 13.375 | 72 | 0.6 | 2.9 | 24 | 22.9 | Yes | 35.7 |
| 13.375 | 72 | 0.8 | 2.52 | 24 | 28.2 | No | 31.5 |

*V/W: the total volume of grooves/coating weight of the solid lubricating coating.
**The area fraction of the main shoulder surface of the pin occupied by the grooves.

As shown in Table 1, even when the outer diameter and the nominal weight (wall thickness) of a threaded joint for pipes were varied (leading to a variation in the shoulder surface area), it was possible to prevent high pressure fluid from being confined inside the non-contacting region 13 if the total volume of the grooves 9a and the coating weight of the solid lubricating coating satisfy above equation (1).

The invention claimed is:

1. A threaded joint for pipes comprising a pin and a box, each having a contact surface including a threaded portion and an unthreaded metal contact portion, the unthreaded metal contact portion including a sealing surface and a shoulder surface, the shoulder surface of the pin being located on an end surface of the pin, a non-contacting region in which the pin and the box do not contact each other being present between the sealing surfaces and the shoulder surfaces of the pin and the box, the threaded joint having one or more grooves formed in the shoulder surface of at least one of the pin and the box and extending to the non-contacting region and to an interior of the threaded joint, characterized in that
at least the contact surface of at least one of the pin and the box has a solid lubricating coating exhibiting plastic or viscoplastic rheological behavior formed thereon, and
a total volume V (mm³) of the grooves and a coating weight W (g) of the solid lubricating coating satisfy the following equation (1):

$$V/W \geq 24 \text{ (mm}^3\text{/g)} \tag{1}$$

2. A threaded joint for pipes as set forth in claim 1 wherein the shoulder surfaces of the pin and the box are each constituted by a main shoulder surface and a sub-shoulder surface connected to the main shoulder surface, the main shoulder surface having a reverse angle of slope and extending to the interior of the threaded joint, and the sub-shoulder surface being located between the main shoulder surface and the non-contacting region and having an angle of slope with respect to a plane perpendicular to a pipe axis which is larger than that of the main shoulder surface.

3. A threaded joint for pipes as set forth in claim 1 wherein an area of an upper end of the grooves in the shoulder surface does not exceed 40% of a surface area of the shoulder surface.

4. A threaded joint for pipes as set forth in claim 2 wherein an area of an upper end of the grooves in the shoulder surface does not exceed 40% of a surface area of the shoulder surface.

5. A threaded joint for pipes as set forth in claim 1 wherein the solid lubricating coating is formed on the contact surface of the box.

6. A threaded joint for pipes as set forth in claim 5 wherein the surface of the pin has a solid anticorrosive coating formed from a UV curable resin.

* * * * *